US006986957B2

(12) United States Patent
Landreth et al.

(10) Patent No.: US 6,986,957 B2
(45) Date of Patent: Jan. 17, 2006

(54) FUEL CELL SYSTEM

(75) Inventors: Bobby Dean Landreth, Ft. Lauderdale, FL (US); Steven D. Pratt, Ft. Lauderdale, FL (US); Sivakumar Muthuswamy, Plantation, FL (US); Ronald J. Kelley, Coral Springs, FL (US); Robert W. Pennisi, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 529 days.

(21) Appl. No.: 10/314,511

(22) Filed: Dec. 9, 2002

(65) Prior Publication Data

US 2004/0131921 A1 Jul. 8, 2004

(51) Int. Cl.
*H01M 8/00* (2006.01)
*H01M 8/04* (2006.01)
*H01M 2/00* (2006.01)
*H01M 4/86* (2006.01)

(52) U.S. Cl. .......................... 429/13; 429/12; 429/17; 429/34; 429/40

(58) Field of Classification Search .................. 429/12, 429/13, 17, 34, 40
See application file for complete search history.

(56) References Cited

U.S. PATENT DOCUMENTS 3,525,643 A * 8/1970 Ryhiner et al. ............... 429/15
3,615,839 A * 10/1971 Thompson et al. .......... 429/16

* cited by examiner

*Primary Examiner*—Patrick Joseph Ryan
*Assistant Examiner*—Thomas H. Parsons
(74) *Attorney, Agent, or Firm*—Randi L. Karpinia

(57) ABSTRACT

A direct methanol fuel cell system 100 uses dissolved catalyst to promote a fuel cell reaction that takes place in an anode sub-chamber 110 of a fuel cell 102. According to the preferred embodiment the dissolved catalyst comprises a macro cyclic coordinated compound of platinum. The dissolved catalyst is preferably continuously circulated through the anode sub-chamber 110, and is preferably mixed in a mixing valve 118 with methanol and water in order to promote its catalytic action.

21 Claims, 2 Drawing Sheets

US 6,986,957 B2

FUEL CELL SYSTEM

BACKGROUND OF THE INVENTION

1. Field of the Invention

The present invention relates in general to fuel cells. More particularly, the present invention relates to methanol fuel cells.

2. Description of Related Art

Given the understanding that fossil fuels are a finite ultimately exhaustible energy resource, and in view increasing demand for energy by growing and economically developing societies, there is continued interest in developing cleaner, and more efficient energy source and energy storage devices.

Fuel cells systems have been identified as a clean, high efficiency energy storage means, and means for converting energy to useable electrical form. Methanol fuel cells in particular have been identified not only as means of storing energy, and converting stored energy to electricity but also part of a renewable (as opposed to exhaustible) energy system based on methanol. Methanol can be produced by fermentation of plant matter and thus represents and inexhaustible energy source.

In one type of methanol fuel cell known as a direct methanol fuel cell, a catalyst (e.g., platinum) coated anode promotes a reaction of methanol and water, that yields ionized hydrogen (protons) and free electrons. Current produced by such a fuel cell is tied to a reaction rate, which in turn is dependent on the surface area of the catalyst coated anode.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
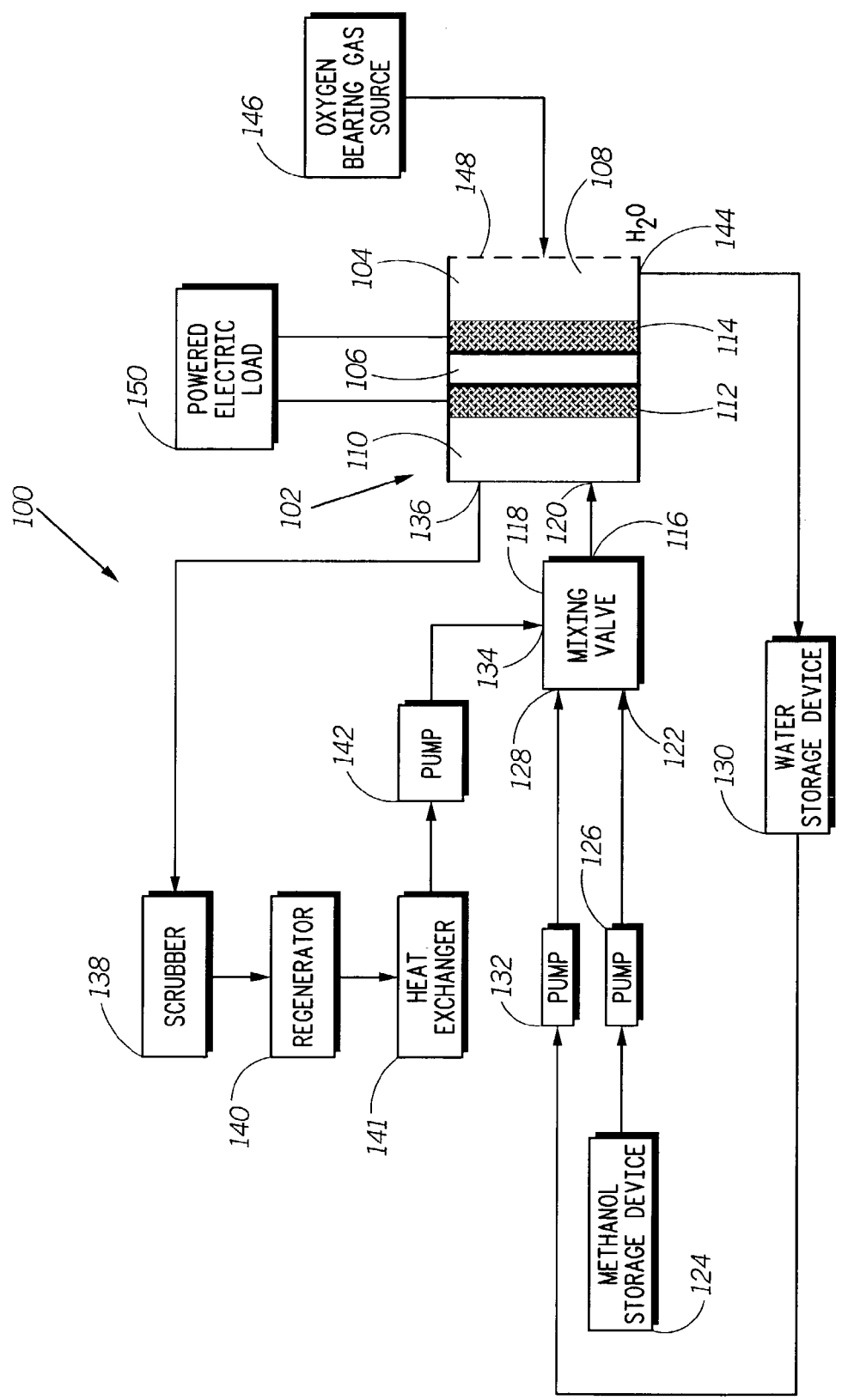
FIG. 1 is a schematic diagram of a fuel cell system according to the preferred embodiment of the invention.

FIG. 1 is a schematic diagram of a fuel cell system 100 according to the preferred embodiment of the invention. Referring to FIG. 1 the fuel cell system 100 includes a fuel cell 102. The fuel cell 102 includes a chamber 104 that is partitioned by a selectively permeable barrier 106 into an anode sub-chamber 110, and a cathode sub-chamber 108. The selectively permeable barrier 106 preferably allows protons to pass but restricts the passage of other chemical species (water, methanol). Suitable materials for use as the selectively permeable barrier 106 include but are not limited to polymer membranes such as perfluorinated sulfonic acid, polyethylene sulfonic acid, and polystyrene sulfonic acid. Composite selectively permeable barriers that include multiple disparate materials are alternatively used.

The anode sub-chamber 110 accommodates an anode 112, and the cathode sub-chamber 108 accommodates a cathode 114. The anode 112, and the cathode 114 are preferably porous, and in contact with the selectively permeable barrier 106. The anode 112 preferably includes a platinum alloy which catalyzes the reaction of methanol and water yielding protons and electrons. Suitable platinum alloys include but are not limited to alloys of platinum with ruthenium, tin, iridium, osmium, or rhenium. Platinum-rhenium alloy is preferred for methanol fuel cells. The cathode 114 is preferably made out of the same material as the anode 112 in order to avoid undesired electrochemical interaction between the two electrodes 112, 114. The platinum alloy can be the unsupported type that comprises a porous mass of sintered particles, or the supported type that includes platinum alloy coated on a high surface area substrate. Supported platinum alloy is preferably formed by coating carbon particles with platinum alloy and thereafter agglomerating the particles. The electrodes 112, 114 preferably further comprise a conductive carbon fiber support.

An outlet 116 of a mixing valve 118 is coupled to an inlet 120 of the anode sub-chamber 110. A first inlet 122 of the mixing valve 118 is coupled to a methanol storage device 124. The methanol storage device 124 is coupled to an inlet of a first pump 126. An outlet of the first pump 126 is in turn coupled to the first inlet 122 of the mixing valve. The methanol storage device 124 preferably stores methanol in a highly concentrated form, although some water may be included along with the methanol in the storage device 124, owing to the fact that complete extraction of water is not cost effective or necessary.

The mixing valve 118 includes a second inlet 128 that is coupled to a water storage device 130. An outlet of the water storage device 130 is coupled to an inlet of a second pump 132. An outlet of the second pump 132 is coupled to the second inlet 128 of the mixing valve 118. Alternatively, all necessary water is stored along with methanol in the methanol storage device 124.

The mixing valve 118 includes a third inlet 134. The third inlet 134 of the mixing valve 118 is coupled to an outlet 136 of the anode sub-chamber 110. The outlet 136 of the anode sub-chamber 110 is coupled to a scrubber 138. The scrubber preferably comprises a gas permeable wall or plug that allows gas (e.g., carbon dioxide) to escape into the atmosphere. The scrubber 138 is coupled to a regenerator 140, and the regenerator 140 is in turn coupled through a heat exchanger 141 to an inlet of a third pump 142. An outlet of the third pump 142 is coupled to the third inlet 134 of the mixing valve 118. The third pump 142 serves to maintain flow of an effluent from the outlet 136 of the anode sub-chamber 110 through the scrubber 138, regenerator 140, heat exchanger 141, and mixing valve 118. The heat exchanger 141, is useful in maintaining the temperature of the fuel cell 102.

An outlet 144 of the cathode sub-chamber 108 is coupled to the water storage device 130. Optionally a check valve (not shown) is included between the cathode sub-chamber 108 and the water storage device 130 for maintain the direction of flow to the water storage device 130.

An oxygen bearing gas source 146 is coupled to the cathode sub-chamber 108. The oxygen bearing gas source 146 is preferably the atmosphere, and the cathode sub-chamber 108 preferably comprises a gas permeable wall 148 for admitting ambient oxygen from the atmosphere.

A powered electrical load 150 is coupled across the anode 112 and the cathode 114.

In operation, methanol and water react in the anode sub-chamber 110 yielding carbon dioxide, protons and electrons. The reaction is ideally described by the following chemical equation:

$$CH_3OH+H_2O \rightarrow CO_2+6H^++6e^-$$ Equation 1

In practice, incomplete oxidation results in some amount of carbon monoxide and oxygen being produce by reactions in the anode sub-chamber 110. Protons produced by the reaction that occurs in the anode sub-chamber 110 diffuse through, the anode 112, and selectively permeable barrier 106 to the cathode 114. Electrons produced by the reaction in the anode sub-chamber 110 are generated at a finite voltage. The electrons are conducted from the anode 112, through the powered electric load 150 to the cathode 114. At the cathode 114 the protons react with oxygen and electrons yielding water. The reaction that takes place in the cathode sub-chamber 108 is ideally described by the following chemical reaction:

$$O_2+4H^++4e^- \rightarrow 2H_2O$$ Equation 2

The current produced by the fuel cell system 100 is directly related to the rate of the reaction that takes place in the anode sub-chamber 108. In order to accelerate the rate of reaction, a dissolved catalyst is circulated through the anode sub-chamber 110. The dissolved catalyst is preferably a macro cyclic coordinated compound that includes a transition metal coordinated ion. The transition metal is preferably platinum. The macro cyclic coordinated compound is preferably one or more of the following:

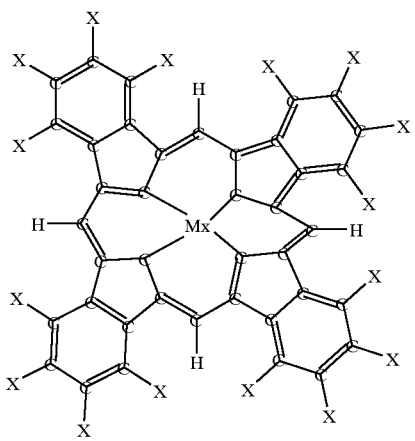

-continued

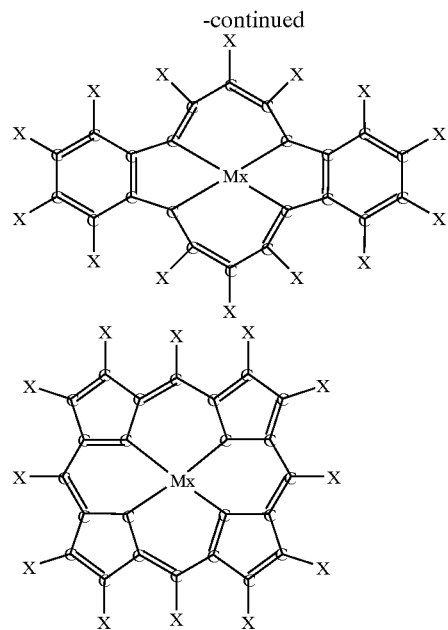

where X is selected from the group including H, OH, $CH_3$, $CH_2CH_3$, $OCH_3$, $PhOCH_3$, and where Mx is a transition metal.

Adding a dissolved catalyst allows the rate of the reaction that occurs in the anode sub-chamber 110 to be accelerated independently of the surface area of the anode 112, and thus allows the power output of the fuel cell 102 to be increased.

The dissolved catalyst continually circulates through the anode sub-chamber 110. The dissolved catalyst flows through a circuit from the anode sub-chamber outlet 136 through the scrubber 138, regenerator 140, heat exchanger 141, pump 142, mixing valve 118 and back into the anode sub-chamber 110 through the inlet 120. The scrubber 138 serves to remove gaseous byproducts e.g. carbon dioxide, and carbon monoxide from the effluent emanating from the anode sub-chamber 110. The regenerator 140 serves to separate carbon monoxide which tends to bond to the dissolved catalyst from the dissolved catalyst. The regenerator preferably works by heating the effluent.

The mixing valve 118 serves to proportion the amounts of methanol, water, and recirculated effluent that are introduced through the inlet 120 of the anode sub-chamber 110. The mixing valve 118 also serves to thoroughly mix the dissolved catalyst with fresh methanol and water thereby promoting the catalytic function of the dissolved catalyst. Alternatively, the mixing valve 118 is eliminated, and the recirculated effluent, water, and methanol are introduced into the anode sub-chamber 110 through a plurality of separate ports, and mix within the anode sub-chamber 110.

Figure 2:
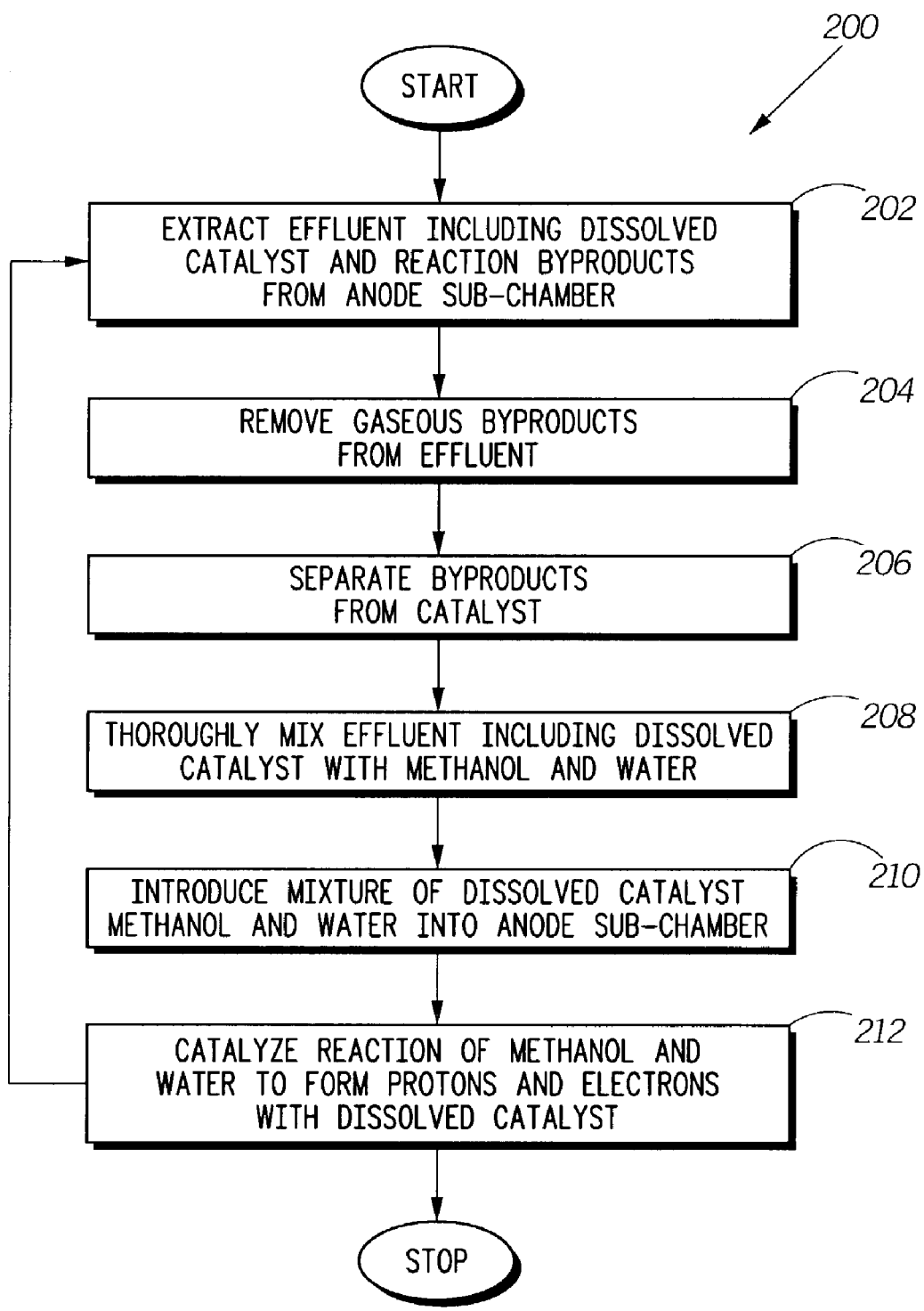
FIG. 2 is a flow chart of a method for converting energy stored in methanol, to electricity according to the preferred embodiment of the invention.

FIG. 2 is a flow chart 200 of a method for converting energy stored in methanol, to electricity according to the preferred embodiment of the invention. In step 202 the effluent including the dissolved catalyst and reaction byproducts are extracted from the anode sub-chamber 110. In step 204 gaseous by products e.g. carbon dioxide are removed from the effluent. In step 206 reaction byproducts (e.g., carbon monoxide) are separated (e.g., by heating) from the dissolved catalyst. In step 208 methanol, and water are mixed into the effluent. In step 210 the effluent including methanol, water, and the dissolved catalyst are reintroduced into the anode sub-chamber 210. In step 212 the reaction of methanol and water to form protons and electrons is catalyzed by the dissolved catalyst. The electrons and protons produced by the mobile dissolved catalyzed in proximity to the surface of the anode, 112, are transferred to the external circuit, 150, and the selectively permeable barrier, 106, respectively to contribute energy to the system. Reaction products produced distant from the anode recombine without contributing to the energy output of the system. The method described by the flow chart cycles continuously, with all steps constantly occurring.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A fuel cell system comprising:
   a fuel cell chamber;
   an anode enclosed in the fuel cell chamber;
   a cathode enclosed in the fuel cell chamber;
   an selectively permeable barrier disposed between the anode and the cathode, the selectively permeable barrier serving to define a first reaction sub-chamber that includes the anode, and a second reaction sub-chamber that includes the cathode;
   a dissolved catalyst disposed in the first reaction sub-chamber;
   at least one inlet into the first reaction sub-chamber for admitting the water, a fuel, and the dissolved catalyst into the first reaction sub-chamber; and
   one or more outlets out of the first reaction sub-chamber for removing an effluent including water, the dissolved catalyst and gaseous byproducts from the first reaction sub-chamber.

2. The fuel cell system according to claim 1 wherein:
   the fuel comprises methanol; and
   the dissolved catalyst comprises a macro cyclic coordinated compound.

3. The fuel cell system according to claim 2 wherein the macro cyclic coordinated compound comprises platinum.

4. The fuel cell system according to claim 2 wherein the macro cyclic coordinated compound includes a compound selected from the group consisting of:

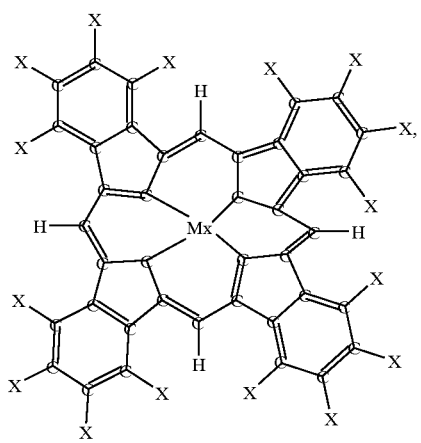

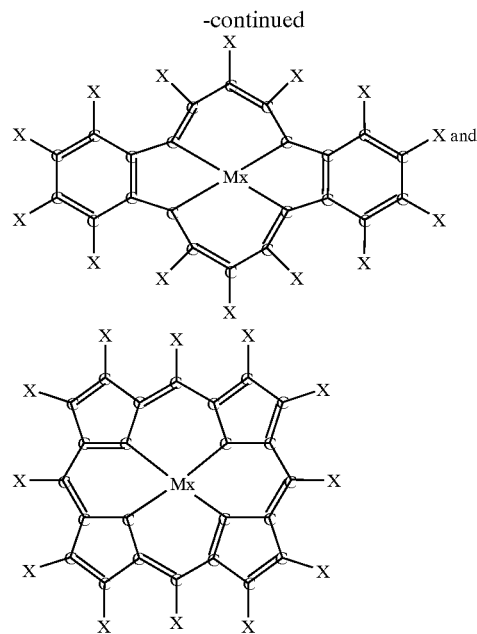

where X is selected from the group including H, OH, $CH_3$, $CH_2CH_3$, $OCH_3$, $PhOCH_3$; and
where Mx is a transition metal.

5. The fuel cell system according to claim 4 wherein Mx is platinum.

6. The fuel cell system according to claim 1 further comprising:
   a mixing valve including a mixing valve outlet coupled to the at least one inlet into the fuel cell chamber.

7. The fuel cell system according to claim 6 wherein:
   the mixing valve further comprises:
      a first inlet that is coupled to a supply of at least the fuel;
      a second inlet that is coupled to the at least one outlet of the fuel cell chamber.

8. The fuel cell system according to claim 7 wherein:
   the mixing valve further comprises:
      a third inlet that is coupled to a separate supply of water.

9. The fuel cell system according to claim 7 further comprising:
   a scrubber coupled to the at least one outlet of the fuel cell chamber for receiving the effluent including the dissolved catalyst, along with gaseous byproducts and removing the gaseous byproducts.

10. The fuel cell system according to claim 7 further comprising:
    a regenerator coupled to the at least one outlet of the fuel cell chamber for receiving the effluent including the dissolved catalyst, and separating carbon monoxide from the dissolved catalyst.

11. The fuel cell system according to claim 7 further comprising:
    a scrubber coupled to the at least one outlet of the fuel cell chamber for receiving the effluent including the dissolved catalyst, along with gaseous byproducts and removing the gaseous byproducts, said scrubber further being coupled to a regenerator, said regenerator serving to receive the effluent including the dissolved catalyst, and separate carbon monoxide from the dissolved catalyst.

12. A method of converting a methanol into electrical energy comprising the steps of:
introducing methanol and water into a fuel cell proximate an anode; and
introducing a dissolved catalyst that catalyzes a reaction of methanol and water that yields hydrogen and electrons into the fuel cell proximate the anode.

13. The method according to claim 12 further comprising the step of:
thoroughly mixing the methanol, water, and dissolved catalyst.

14. The method according to claim 13 wherein the step of thoroughly mixing takes place prior to the steps of introducing the methanol, water, and dissolved catalyst.

15. The method according to claim 12 wherein:
the fluid catalyst comprises a macro cyclic coordinated catalyst compound.

16. The method according to claim 15 wherein the macro cyclic coordinated catalyst is selected from the group consisting of:

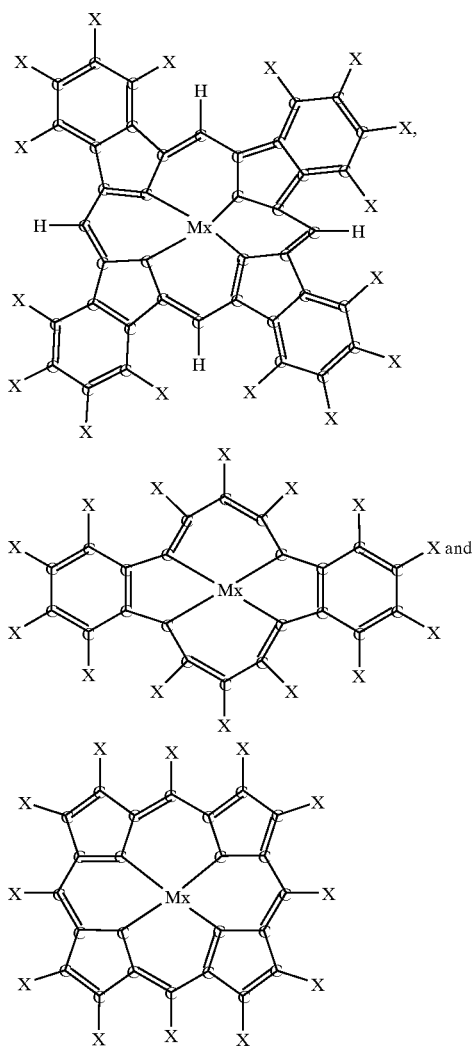

where X is selected from the group consisting of H, OH, $CH_3$, $CH_2CH_3$, $OCH_3$, $PhOCH_3$; and
where Mx is a transition metal.

17. The method according to claim 16 wherein Mx is platinum.

18. The method according to claim 14 further comprising the steps of:
extracting an effluent that includes water, the fluid catalyst, and reaction byproducts from the fuel cell;
passing the effluent through a scrubber that removes gaseous reaction byproducts from the effluent.
passing the effluent back into the fuel cell.

19. The method according to claim 14 further comprising the step of:
prior to passing the effluent back into the fuel cell, heating the effluent to separate carbon monoxide from the dissolved catalyst.

20. A fuel cell system comprising:
a fuel cell chamber;
an anode enclosed in the fuel cell chamber;
a cathode enclosed in the fuel cell chamber;
an selectively permeable barrier disposed between the anode and the cathode, the selectively permeable barrier serving to define a first reaction sub-chamber that includes the anode, and a second reaction sub-chamber that includes the cathode;
at least one inlet into the first reaction sub-chamber for admitting water, a fuel, and a dissolved catalyst into the first reaction sub-chamber; and
one or more outlets out of the first reaction sub-chamber for removing water including the dissolved catalyst and gaseous byproducts from the first reaction sub-chamber.

21. A fuel cell reaction mixture comprising:
water;
methanol; and
a catalyst selected from the group consisting of:

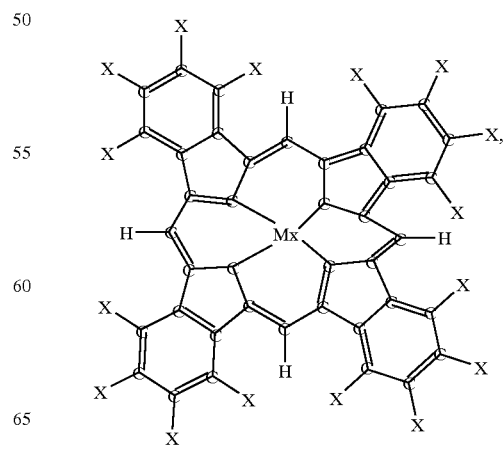

-continued
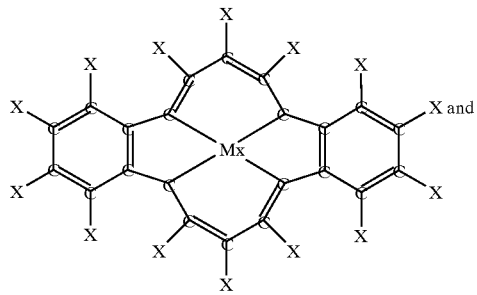 X and
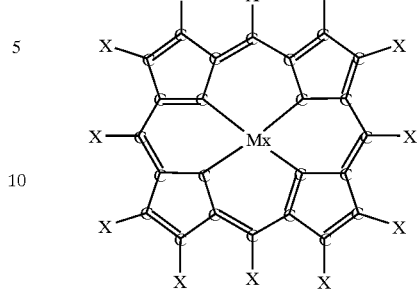
where X is selected from the group including H, OH, $CH_3$, $CH_2CH_3$, $OCH_3$, $PhOCH_3$; and
where Mx is a transition metal.
* * * * *